F. DOUTHITT.
METHOD OF ASCERTAINING CAMERA STOPS.
APPLICATION FILED AUG. 23, 1918.
1,309,398.
Patented July 8, 1919.
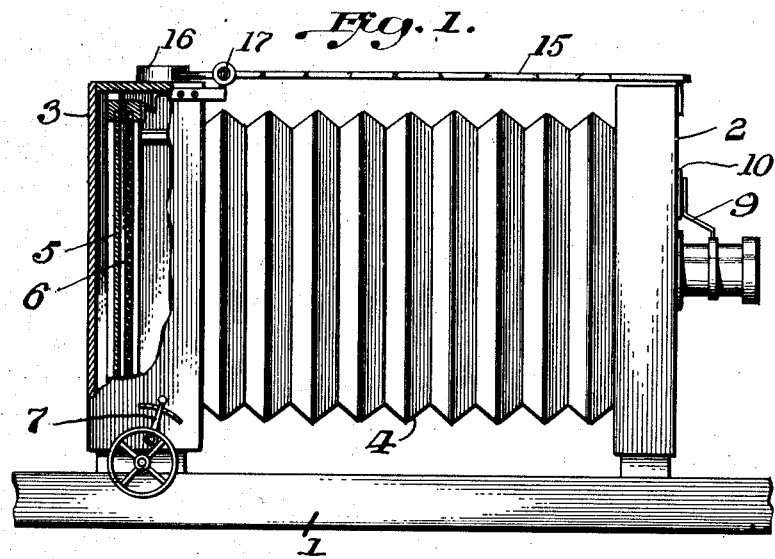
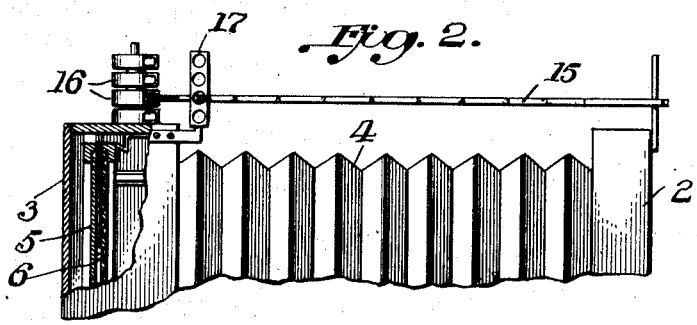
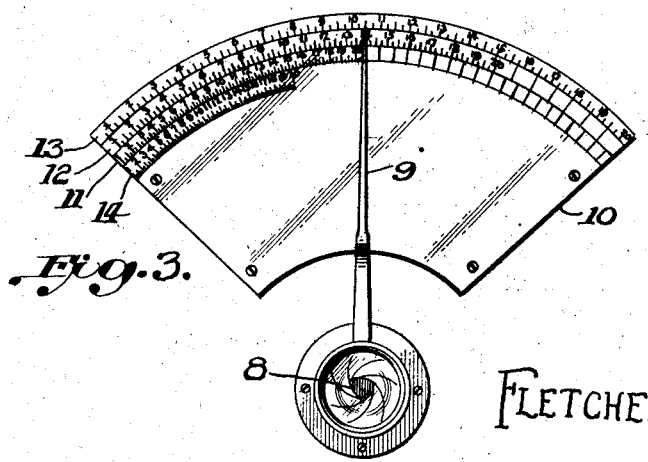
Inventor
FLETCHER DOUTHITT.
By
Attorneys

UNITED STATES PATENT OFFICE.

FLETCHER DOUTHITT, OF DETROIT, MICHIGAN.

METHOD OF ASCERTAINING CAMERA-STOPS.

1,309,398.   Specification of Letters Patent.   Patented July 8, 1919.

Application filed August 23, 1918. Serial No. 251,060.

*To all whom it may concern:*

Be it known that I, FLETCHER DOUTHITT, a citizen of the United States of America, residing at Detroit, in the county of Wayne and State of Michigan, have invented certain new and useful Improvements in Methods of Ascertaining Camera-Stops, of which the following is a specification, reference being had therein to the accompanying drawings.

In the photo-engraving art there is considerable uncertainty of guess work in the reproduction of copy when making half tone dot negatives, by a plurality of exposures in a camera requiring a combination of diaphragm stops, and my invention aims to provide a method of ascertaining the combination of stops with absolute accuracy, so that better half-tone negatives may be produced.

In carrying my method into effect, it is necessary that a camera be provided with certain mechanical devices, and in order that my method may be understood, reference will be had to the drawings, wherein—

Figure 1 is a side elevation of a portion of the camera, partly broken away and partly in section;

Fig. 2 is a side elevation of a portion of a camera illustrating a plurality of tape holders;

Fig. 3 is a front elevation of the diaphragm or shutter of the camera provided with stop indicator.

In the drawing, 1 denotes a camera bed for a camera having a front section 2 and a rear section 3, these sections being connected by the usual bellows 4.

5 denotes a sensitized plate behind a screen 6 and said screen is of the usual kind made by ruling two pieces of glass with lines and connecting the pieces of glass together so that the lines of one piece of glass are at a right angle to the lines of the other piece of glass. The opaque lines are spaced so that the interstices or transparent spaces between the lines will be the same width as the opaque lines. As in the art, the screens may be anywhere from sixty to two hundred lines so that an operator familiar with the work to be reproduced, may select a proper screen.

7 denotes a conventional form of mechanism for adjusting the screen 6 relative to the sensitized plate 5, and the space between the screen and the sensitized plate will be hereinafter termed the "screen distance" or "separation", which is varied for different dot formations, that are controlled by the laws of geometrical projection, and in this instance, regulated by the bellows extension of the camera.

8 generally denotes the diaphragm of the lens, and the diaphragm has a hand 9 projecting upwardly in front of a scale or indicia plate 10 which is secured to the front section of the camera. On the indicia plate are placed four series of graduations 11, 12, 13 and 14, said series of graduations being for the necessary diaphragm openings when making a half tone negative. The diaphragm stops are generally known as:—

The detail stop which gives the tones between the dark tones and the medium tones; the graduations 11 being used, and The pick-up stop that gives the detail in the tone of the copy between medium tones and the white tones; the graduations 12 being used.

The high light stop which transfers the white parts of the copy to the plate 5 and secures the general outline of the copy to be reproduced; the graduations 13 being for said stop, and The color detail stops employing the graduations 14.

To graduate the plate 10 for the first or detail stop, I first ascertain the size of the opening of the diaphragm 8 when wide open. Since the openings of no two diaphragms are exactly alike, I use a series of perfectly true plugs or rods of known diameter and by trying said rods in a diaphragm opening, I learn the exact size of the same. Supposing the size of a diaphragm opening is $\frac{50}{1000}$, I then lay off the series of consecutively numbered graduations 11 each of which is $\frac{50}{1000}$ and each of which may be subdivided, for instance, into four sub-divisions or as many depending on the minuteness of adjustment desired. From these graduations are determined the graduations 12, 13 and 14 as will hereinafter appear.

15 denotes a tape or rollable scale having graduations or indicia thereon, and this tape connects the front and rear sections of the camera. The free end of the tape is attached to the front section 2 of the camera and the opposite end of the tape extends past a sight opening member 17 into a take-up device 16, both of which are on the rear section 3 of the camera, so that when the bellows 4 are extended or retracted, the tape 15 will be wound and unwound relative to the take-up device 16.

In connection with the mechanical elements referred to, there are four facts to be considered in connection with my method, namely, the transparent screen opening, the bellows extension, the screen distance or separation, and the size of the stop, and it has been found that the dot formation is controlled by a ratio, wherein the camera extension is to the size of the stop as the screen distance is to the size of the screen opening.

In carrying out the equation, I find it convenient to reduce all measurements to the thousands of an inch, furthermore to use an arbitrary factor on both sides of the ratio equation previously mentioned. This arbitrary factor, however, may represent a number that will facilitate making the calculations or a number which the operator has been accustomed to using. For instance, when installing my camera devices, I find that operators have different opinions as to the proper screen distance or separation for making negatives—some say fifty, others seventy-five and so on. I select as my arbitrary factor whatever he has been accustomed to setting the adjusting mechanism 7 and for the convenience of setting forth an example of finding the screen distance or separation and a stop to conform to the screen distance, I will use 50 as an arbitrary factor.

Considering that a 120 lines screen is used, that is, 120 lines per inch, the same is reduced to the fraction of $\frac{1}{120}$ and is divided by $\frac{1}{2}$ to obtain $\frac{1}{240}$ of an inch, representing the transparent opening between the lines of the screen. As before stated, since the transparent spaces between the opaque lines of the screen are the same width as the lines, is therefore the reason for dividing the number of lines to obtain the size of a screen opening. In reducing this $\frac{1}{240}$ of an inch to thousandths, the same represents .004$\frac{1}{6}$.

Since the series of graduations 11 have been laid out on the indicia plate or scale 10 for $\frac{50}{1000}$, this may be used as .050.

As the lens scale or stop on one side of the equation has been multiplied by a thousand, it is equally necessary to multiply the screen opening, .004$\frac{1}{6}$ by a thousand and the resultant is $\frac{4166}{1000}$ of an inch. This gives the first division or graduation for the tape 15, a space measuring 4$\frac{83}{500}$ of an inch. The tape is now laid out in equal divisions, each 4$\frac{83}{500}$ of an inch and the divisions are consecutively numbered and divided into sub-divisions corresponding in number to the sub-divisions on the lens scale. In consequence of the comparative scales, it is only necessary to observe the bellows extension on the tape and whatever is indicated on the tape set the hand 9 at the same designation on the diaphragm scale, thus giving the proper stop in accordance with the screen opening and bellows extension for a detail exposure.

To compute the screen separation, so that the screen adjusting mechanism 7 may be properly set, the first division on the tape is $\frac{4166}{1000}$ is multiplied by the factor .050 and the result is .083$\frac{8}{25}$. As the screen opening is .004$\frac{1}{6}$; .083$\frac{8}{25}$ times the screen opening equals .347 of an inch, and the mechanism 7 is accordingly adjusted so that the ruled center of the screen 6 will be exactly .347 of an inch from the sensitized plate upon which the negative is to be made.

In the beginning I had the equation wherein the camera extension is to the stop as the screen distance is to the screen opening, then considering the screen distance as the unknown quantity (X), I have Camera ext.　　Stop.　　Screen dist.　Screen opening $$4\frac{83}{500} \; : \; \frac{50}{1000} \; :: \; X \; : \; \frac{.025}{6}$$

$$\frac{50}{1000}X = 4\frac{83}{500} \text{ times } \frac{.025}{6}$$

$$X = .17\frac{43}{100} \div \frac{50}{1000}$$

$$X = .347$$

In making the above calculations, there is an error introduced by the refraction of light through the back half of the screen, and according to scientific formula this is equal to one-third of the thickness of the cover glass. As the average cover glass is about .085 of an inch, one-third of .085 or about .028 may be deducted from .347 and I have .319 of an inch as the exact distance from the ruled center to the sensitized plate.

The above example is for the detail stop used for the main exposure of the negative in the average copy, and it is necessary to use two supplementary stops for closing the high lights and building density on both the high lights and the detail dots. The method of finding the high light stops and placing the graduations 13 is as follows:

As the detail stop gives, upon proper exposure, a dot equal to the opening of the screen, it now becomes necessary to use a stop that will allow the light rays to meet behind the opaque lines of the screen, and geometrical law teaches that an opening exactly twice the size of the detail stop allows the light rays to spread half the distance of the opaque line, just allowing the light rays to meet behind the lines. As the high light stop is twice the size of the detail stop, the time of the stop would be one-fourth the time used in the detail exposure. Therefore, the graduations 13 are twice the size of the graduations 11 and the graduations 13 may be sub-divided, as shown. This gives the high light stop and the graduations are easily and accurately placed by reason of the "one" graduation being exactly above the "two" graduation of the detail stop and so on.

As the pick-up stop is used for the purpose of giving density to the first and second exposures, this stop has the graduations 12 half the distance between the high light and the detail stop graduations. In other words, the "two" graduation is directly above the "three" graduation of the detail stop, "four" above the "six," "six" above the "nine," and so on.

The graduations 14 on the diaphragm scale are used when copying any extremely dark detail which would not form a dot image on the time given under normal exposure. The graduations are about one-third that of the detail stop graduation, so that they may be used for a length of time necessary to form a hard dot in the detail and not overlap or destroy the tones secured by the three previous stop openings through the diffusion of light.

It is also possible to carry the method into the minutest detail by providing the diaphragm scale with additional sets of graduations, some of which may be between the detail, pick-up and the high light stops, thus permitting of an operator obtaining any desired result so far as an exposure is concerned.

From the foregoing, it will be noted that the method has been carried out in connection with 120 lines screen and a single tape, so for other screens, I may equip a camera with a multiplicity of tapes, disposed one above the other so as to be easily observed, or I may use a wide tape properly graduated for a plurality of screens.

What I claim is:—

1. The method of ascertaining the combination of stops for the production of half tone dot negatives, by a plurality of exposures in a camera, having a lined screen and adapted to have a sensitized plate placed in the rear thereof, a lens movable to and from the screen, a tape between the lens and said screen, an adjustable diaphragm for the lens, and a scale adjacent said diaphragm, which method consists in first ascertaining the size of a diaphragm opening, reducing the size of the opening to thousandths of an inch, graduating the diaphragm scale into such thousandths of an inch, ascertaining the screen opening, reducing the size of the screen opening to thousandths of an inch and graduating the tape into such thousandths of an inch so that the diaphragm may be set according to the camera extension.

2. The method of ascertaining the combination of stops for the production of half tone dot negatives, by a plurality of exposures in a camera, having a lined screen and adapted to have a sensitized plate placed in the rear thereof, a lens movable to and from the screen, a tape between the lens and said screen, an adjustable diaphragm for the lens, and a scale adjacent said diaphragm, which method consists in first computing the detail stop by an equation wherein the camera extension is to the size of the stop as the screen distance is to the screen opening, computing the high light stop from the detail stop, computing the pick-up stop from the high light stop, and correspondingly graduating the tape and lens scales so that the diaphragm may be adjusted according to the camera extension.

3. The method of ascertaining the combination of stops for the production of half tone dot negatives, by a plurality of exposures in a camera having a lined screen and adapted to have a sensitized plate placed in the rear thereof, a lens movable to and from the screen, a tape between the lens and said screen, an adjustable diaphragm for the lens, and a scale adjacent said diaphragm, which method consists in first ascertaining the size of the diaphragm opening and placing graduations on the diaphragm scale to indicate such openings and fractions thereof, and then ascertaining the screen opening and placing graduations on the tape corresponding in number to the graduations of the scale so that said diaphragm may be set at a graduation indicated by the tape.

4. The method of ascertaining the combination of stops for the production of half tone dot negatives, by a plurality of exposures in a camera having a lined screen and adapted to have a sensitized plate placed in the rear thereof, a lens movable to and from the screen, a tape stretched between said lens and said screen, an adjustable diaphragm for said lens, and a scale adjacent said diaphragm, which method consists in first ascertaining the detail stop, ascertaining the high light stop from the detail stop and then ascertaining the pick-up stop from the high light stop, the detail stop being found by first ascertaining the size of the diaphragm opening, reducing the size of the diaphragm opening to thousandths of an inch, graduating the diaphragm scale into such thousandths of an inch, ascertaining the screen opening, reducing the size of the screen opening to thousandths of an inch, graduating the tape into such thousandths of an inch so that the diaphragm may be set according to the camera extension, then further graduating the diaphragm scale so that the high light stop has graduations twice that of the detail stop, and then further graduating the diaphragm scale for the pick-up stop with the graduations of said pick-up stop one-fourth less than the high light stop graduations.

5. The method of ascertaining the screen separation in a camera used for the production of half tone dot negatives, and wherein a lined screen has a sensitized plate placed in the rear thereof with a lens movable to and from said screen which method consists in first ascertaining the distance of the lens from the screen, dividing such distance by an arbitrary factor, ascertaining the size of the screen opening and then multiplying the size of the screen opening by the divisional resultant.

6. The method of ascertaining the screen separation in a camera having a line screen, a sensitized plate in the rear thereof, mechanism for adjusting the screen, a lens movable to and from the screen, and a tape to indicate the distance of said lens from said screen, which method consists in first ascertaining the camera extension by said tape, dividing the camera extension by an arbitrary factor, ascertaining the size of the screen opening, and then multiplying the size of the screen opening by the divisional resultant and setting the screen adjusting mechanism accordingly.

7. The method of ascertaining the combination of stops for the production of half tone dot negatives, by a plurality of exposures in a camera having a line screen and adapted to have a sensitized plate placed in the rear thereof, a lens movable to and from the screen, a tape stretched between said lens and said screen, an adjustable diaphragm for said lens, and a scale adjacent said diaphragm, which method consists of first ascertaining the detail stop and computing the high light and pick-up stops from the detail stop, which is obtained by ascertaining the size of the screen opening, reducing the size of the screen opening to the thousandths of an inch, graduating the diaphragm scale according to an arbitrary factor, dividing the screen opening by the same arbitrary factor and graduating the tape accordingly with the graduations and fractions thereof corresponding in number to the graduations and fractions of the diaphragm, and further graduating the diaphragm scale for the high light and pick-up stops with the high light stop graduations twice that of the detail stop graduations and the pick-up stop graduations one-fourth that of the high light stop graduations.

In testimony whereof I affix my signature in the presence of two witnesses.

FLETCHER DOUTHITT.

Witnesses:
  KARL H. BUTLER,
  ANNA M. DORR.